United States Patent
Chakrapani Rao et al.

(10) Patent No.: US 9,152,385 B2
(45) Date of Patent: Oct. 6, 2015

(54) SYSTEMS AND METHODS FOR GENERATING HIGH-QUALITY FORMAL EXECUTABLE SOFTWARE FEATURE REQUIREMENTS

(75) Inventors: Arun Chakrapani Rao, Bengaluru (IN); Manoj G. Dixit, Bangalore (IN); Ramesh Sethu, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/401,877

(22) Filed: Feb. 22, 2012

(65) Prior Publication Data

US 2013/0219354 A1    Aug. 22, 2013

(51) Int. Cl.
*G06F 9/44* (2006.01)
*G06F 17/22* (2006.01)
*G06F 17/24* (2006.01)
*G06F 17/27* (2006.01)

(52) U.S. Cl.
CPC .............. *G06F 8/10* (2013.01); *G06F 17/2264* (2013.01); *G06F 17/241* (2013.01); *G06F 17/271* (2013.01)

(58) Field of Classification Search
CPC .............. G06F 8/10; G06F 8/20; G06F 8/24; G06F 8/30; G06F 8/34; G06F 8/36; G06F 17/2261; G06F 17/241; G06F 17/271; G06Q 10/06
USPC .......................................................... 717/104
See application file for complete search history.

(56) References Cited

U.S. PATENT DOCUMENTS

| | | | | |
|---|---|---|---|---|
| 5,555,169 | A * | 9/1996 | Namba et al. | 704/9 |
| 6,453,465 | B1 * | 9/2002 | Klein | 717/141 |
| 6,671,874 | B1 * | 12/2003 | Passova | 717/126 |
| 7,917,890 | B2 * | 3/2011 | Barcellona | 717/106 |
| 2002/0062475 | A1 * | 5/2002 | Iborra et al. | 717/108 |
| 2003/0046061 | A1 * | 3/2003 | Preston et al. | 704/9 |
| 2008/0229195 | A1 * | 9/2008 | Brauel et al. | 715/700 |
| 2010/0257505 | A1 * | 10/2010 | Hinchey et al. | 717/101 |
| 2010/0325606 | A1 * | 12/2010 | Sundararajan et al. | 717/105 |
| 2011/0029326 | A1 * | 2/2011 | Venon | 705/3 |
| 2011/0088011 | A1 * | 4/2011 | Ouali | 717/105 |

FOREIGN PATENT DOCUMENTS

| | | | |
|---|---|---|---|
| EP | 0442240 A2 * | 8/1991 | |
| WO | WO 2008054331 A1 * | 5/2008 | |

OTHER PUBLICATIONS

Kalnins et al., "A Model-Driven Path from Requirements to Code," Scientific Papers, University of Latvia, 2010, vol. 756, pp. 3357, last retrieved from http://www.lu.lv/materiali/apgads/raksti/756_pp_33-57.pdf on Jul. 23, 2014.*

Strunk, Elizabeth, "The Role of Natural Language in a Software Project," May 2002, last retrieved from http://www.cs.virginia.eduNck/publications/strunk.thesis.pdf on 23 Jul. 2014.*

* cited by examiner

*Primary Examiner* — Wei Zhen
*Assistant Examiner* — Andrew M Lyons
(74) *Attorney, Agent, or Firm* — Mickki D. Murray; Parks Wood LLC

(57) ABSTRACT

Systems and methods for generating formal software requirements using an informal requirements document having informal requirements and annotations associated with the informal requirements. The systems and methods extract syntax from the annotations and generate artifacts as a function of the syntax.

20 Claims, 3 Drawing Sheets

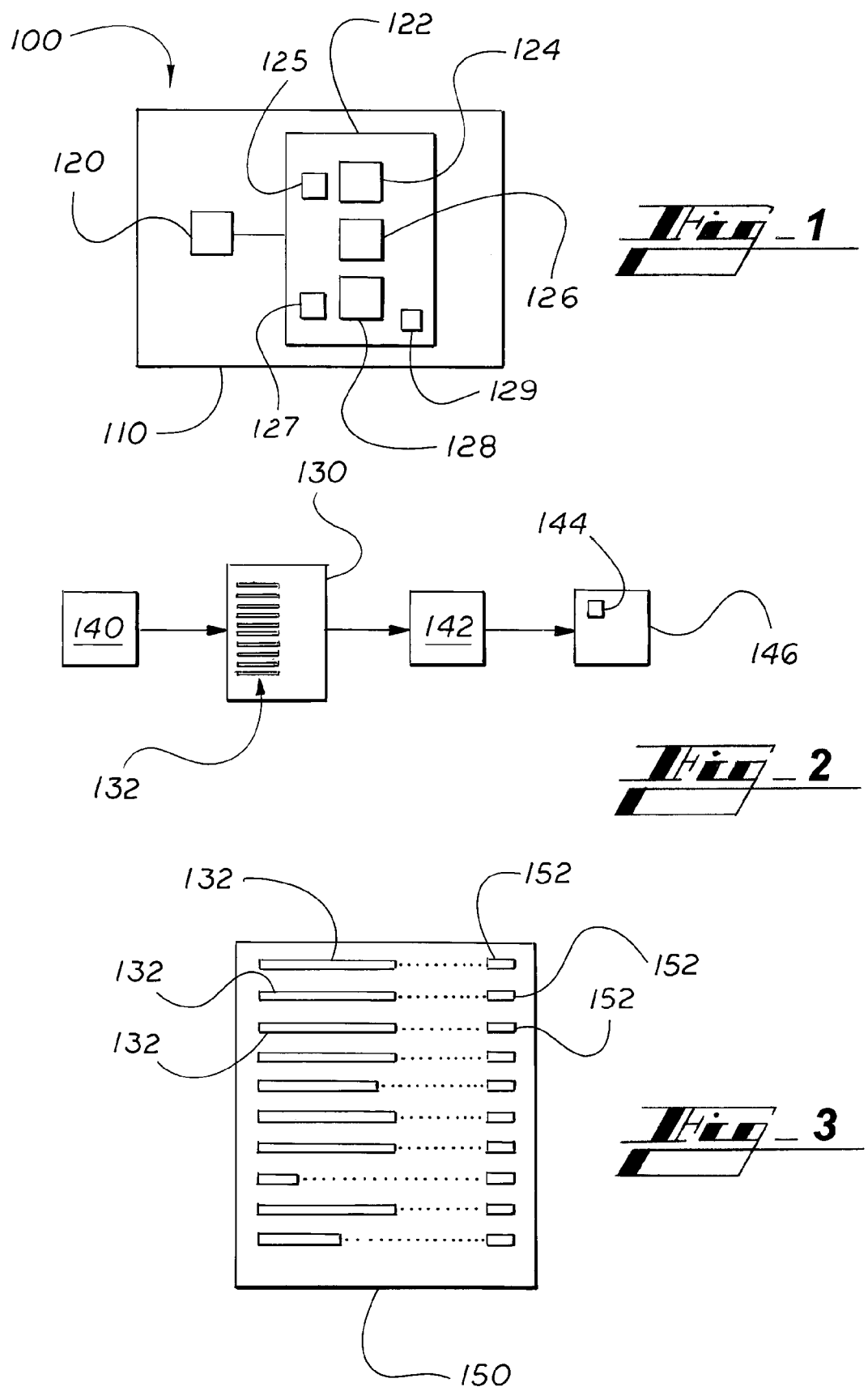

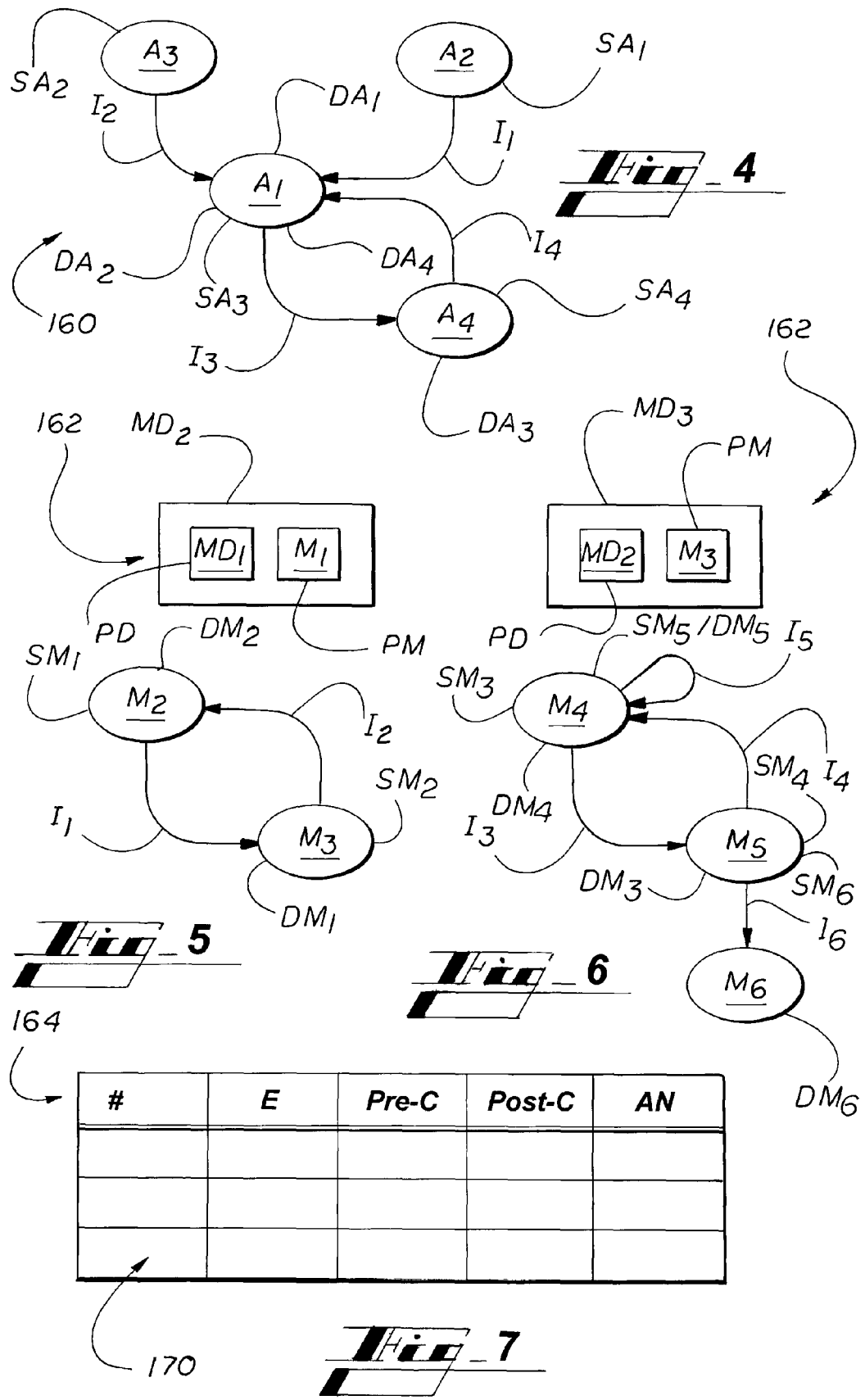

SYSTEMS AND METHODS FOR GENERATING HIGH-QUALITY FORMAL EXECUTABLE SOFTWARE FEATURE REQUIREMENTS

TECHNICAL FIELD

The general technical field is software development and, more specifically, systems and methods for generating software feature requirements.

BACKGROUND

The process of generating software feature requirements involves taking natural language requirements and converting them to formal executable requirements. The conversion from natural language requirements to formal executable requirements can be subjective and involve loss of information. Analysis that is currently used to make the process more objective and preserve information is time consuming. For example, such analysis includes manual review of requirements and is restricted to mental models.

SUMMARY

The various embodiments overcome the shortcomings of the prior art by providing systems and methods for generating software feature requirements that incrementally and traceably convert natural language requirements to formal executable requirements. The systems and methods include an annotated requirements document that captures feature information associated with informal requirements and facilitates generating artifacts to assist with review and early comprehension of requirements behavior at various levels of abstraction. The systems and methods convert natural language requirements to formal executable requirements using an iterative and gradual process. As such, the systems and methods retain the information in the natural language requirements and convert the requirements in an objective manner.

For example, the systems and methods described herein can be used to generate automotive embedded control software features such as adaptive cruise control software and the like. According to an exemplary embodiment, systems and methods for generating formal software requirements from an informal requirements document include associating annotations with the informal requirements, extracting syntax from the annotations, and generating artifacts as a function of the syntax.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a schematic view of a requirements analysis system.
FIG. 2 is a schematic view of a process of converting informal requirements to formal executable requirements.
FIG. 3 is a schematic view of an annotated requirements document.
FIG. 4 is a schematic view of a first exemplary artifact.
FIG. 5 is a schematic view of a second exemplary artifact.
FIG. 6 is a schematic view of a third exemplary artifact.
FIG. 7 is a schematic view of a fourth exemplary artifact.

DETAILED DESCRIPTION

Figure 8:
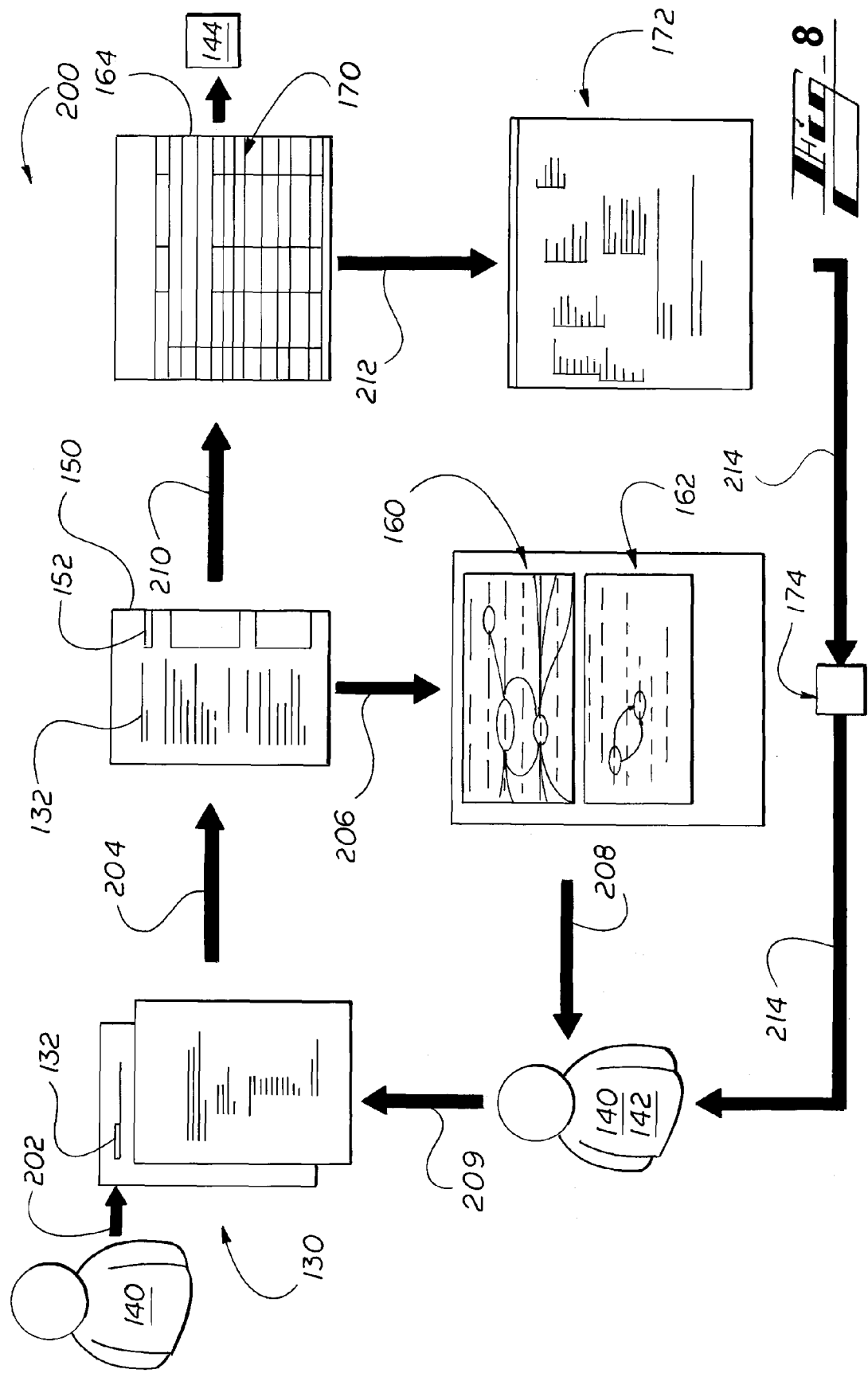
FIG. 8 is a flow chart illustrating an exemplary method using the requirements analysis system of FIG. 1.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

System

Referring to FIG. 1, a requirements analysis system 100 includes a central processing unit (CPU) 110. The CPU 110 includes a processor 120, a memory 122 or other tangible, non-transitory, computer-readable media, and software applications 124, 125, 126, 127, 128, 129 that include computer-executable instructions. The software applications 124, 125, 126, 127, 128, 129 are stored in the memory 122. Each software application 124, 125, 126, 127, 128, 129 may include at least one tangible, non-transitory hardware component.

While the methods described herein may, at times, be described in a general context of computer-executable instructions, the methods of the present disclosure can also be implemented in combination with other applications and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer readable media includes, for example, volatile media, non-volatile media, removable media, and nonremovable media. The term computer-readable media and variants thereof, as used in the specification and claims, refer to tangible, non-transitory, storage media. In some embodiments, storage media includes volatile and/or non-volatile, removable, and/or nonremovable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

For purposes of teaching, the requirements analysis system 100 is shown and described primarily as a single CPU with a plurality of applications. However, in alternative embodiments, a requirements analysis system can include a plurality of independent CPUs with software applications that work together to achieve the methods described in further detail below.

Applications

Referring to FIGS. 1, 2, and 3, an annotated requirements document application 124 (FIG. 1) is configured to, when executed by the processor 120, cause the processor to facilitate creating a requirements document 130 (FIG. 2) that includes a set of informal requirements 132. Generally, informal requirements 132 are functional requirements of a feature that specify particular actions or results of a software system in natural language or the like. Exemplary features include Advanced Driver Assistance, such as Adaptive Cruise Control, In-vehicle Navigation, Lane Change Assistance, and Collision Avoidance.

For purposes of teaching, referring to FIG. 2, the informal requirements 132 are developed by ah engineering group 140 to guide a software group 142 when developing product software 144 for a product 146. In one embodiment, the requirements document includes one or more of a word-processing document, a spreadsheet, and a publishing document. The annotated requirements document application 124 can be a word processing program, a desktop publisher, a spreadsheet program, and the like.

Referring to FIGS. 1 and 3, the annotated requirements document application 124 is further configured to, when executed by the processor 120, cause the processor to facilitate inserting annotations 152 in the requirements document 130 to create an annotated requirements document 150. In the example shown schematically in FIG. 3, annotations 152 include comment bubbles in margins of the annotated requirements document 150. The comment bubbles are connected to selected text of the informal requirements (e.g., particular informal requirements 132).

In alternative embodiments, annotations 152 include any of footnotes, endnotes, other mechanisms for connecting comments to informal requirements, and other commenting mechanisms that allow for insertion of comments alongside each informal requirement 132. The software group 142 generates syntax of the annotations 152 for each of multiple artifacts 160, 162, 164 (identified in FIGS. 4-8). The annotations and syntax are described further in the next section.

When combined, artifacts 160, 162, 164 provide some or all paths between a given source and destination mode (feature behavioral state) at any level of hierarchy (e.g., mode and sub-mode), provide entry conditions for a particular mode, generate traces, and make the review process convenient and efficient. For example, if a feature has two modes, DISABLED and ENGAGED, the entry condition for ENGAGED mode could be "With the feature in DISABLED mode, driver presses the engage button AND no sensor failures have occurred," In other words, the entry condition describes the condition that causes the particular mode to be entered.

A trace, on the other hand, gives a complete path between a given source mode and a given destination mode. Again, for example, if a feature has three modes (e.g., ACTIVE, ENGAGED and OVERRIDE), a trace from source mode ACTIVE to destination mode OVERRIDE could be "When the feature is in ACTIVE mode and driver presses an engage button, feature enters ENGAGED mode; then, when the driver takes some particular action to override an action caused by the feature (so that he/she takes back control), the feature enters OVERRIDE mode." In other words, a trace gives one path in the mode diagram that will cause the feature to go from a given source mode to a given destination mode (via any intermediate modes) and this includes the conditions under which the corresponding mode changes can occur. These features and functions are described further below.

Annotations and Syntax

Each annotation 152 includes syntax associated with at least one corresponding informal requirement 132. For example, referring momentarily to FIGS. 4-7, the syntax is executable to generate artifacts 160, 162, 164, described in further detail below. The annotations 152 provide a traceable connection between the informal requirements 132 and elements of the artifacts 160, 162, 164 in order to facilitate review and modification, as described in further detail below. Each annotation 152 can include syntax for different kinds of artifacts 160, 162, 164 and an associated application is configured to, when executed by the processor 120, cause the processor to select relevant parts of the syntax to generate the artifacts as described in further detail below.

Generally, artifacts include visual descriptions of feature behavior, textual descriptions of feature behavior, combinations thereof, and the like. Herein, exemplary visual descriptions include a context diagram 160 (FIG. 4) and a mode diagram 162 (FIGS. 5 and 6). An exemplary textual description includes a transition system definition 164 (FIG. 7). Below, the term artifacts is used to describe the artifacts 160, 162, 164 as a group and specific names of artifacts (i.e., context diagram 160, mode diagram 162, transition system definition 164) are used to specifically or individually describe the artifacts 160, 162, 164.

First Artifact Application

Referring to FIGS. 1, 3, and 4, a first artifact application 125 is configured to, when executed by the processor 120, cause the processor to extract syntax from the annotations 152 in the annotated requirements document 150 and generate the context diagram 160 as a function of the syntax of the annotations 152. Context diagrams 160 illustrate connections between different modules or entities of a feature that is identified in the requirements document 130. Modules or entities of a feature are referred to herein as agents A. Referring to FIG. 4, the syntax for the context diagram 160 includes agents A (e.g., a source agent SA and a destination agent DA) and information I. For example, information I can be a description of an event. In creating the syntax for a context diagram 160, information I and agents A are well-identified and at least one of the agents A is the feature under consideration in the context diagram 160 and the information I describes an interaction and/or a relationship between agents A.

For example, in an example embodiment, the syntax for the context diagram 160 is @<context diagram>@ Source-Agent-Name→Destination-Agent-Name [Information, Requirement Number]. Generally, @<context diagram>@ identifies the syntax for a context diagram and information includes a description of the interaction between the source agent SA and the destination agent DA. The requirement number is a number used to identify the particular feature requirement.

As shown in FIG. 4, the exemplary context diagram 160 includes a number of exemplary agents A1, A2, A3, A4 and exemplary information I1, I2, I3, I4 (each shown by an arrow indicating direction from a respective source to a respective destination) that relate the agents A. Information I1 relates agent A2, acting as a source agent SA1, to agent A1, acting as a destination agent DA1; information I2 relates agent A3 as a source agent SA2 to agent A1 as a destination agent DA2; information I3 relates agent A1 as a source agent SA3 to agent A4 as a destination agent DA3; and information I4 relates agent A4 as a source agent SA4 to agent A1 as a destination agent DA4. The first artifact application 125 is further configured to, when executed by the processor 120, cause the processor to automatically analyze the artifact 160 to generate a listing of all inputs from and outputs to the various agents A with which the software feature interacts.

Second Artifact Application

Referring to FIGS. 1, 3, 5, and 6, a second artifact application 126 is configured to, when executed by the processor 120, cause the processor to extract the annotations 152 from the annotated requirements document 150 and generate the mode diagram 162 as a function of the syntax of the annotations 152. Mode diagrams illustrate a feature in different modes and sub-modes of operation.

Each mode diagram 162 is uniquely identified by a mode diagram name MD that distinguishes it from other mode diagrams 162. In one embodiment, the mode diagram name MD includes a parent diagram name PD, which uniquely identifies the parent mode diagram 162 associated with the mode diagram 162, and a parent mode name PM, which uniquely identifies the mode in the parent mode diagram 162 of which the mode diagram 162 is a detailed expansion.

For example, syntax for the mode diagram 162 is @<mode-diagram>@ <Mode-Diagram-Name> <Parent-Diagram-Name> Parent-Mode-Name [Information, Requirement Number]. Generally, @<mode-diagram>@ identifies the syntax for a mode diagram; the names arenas described above; and the information may include, for example, why the parent mode in the parent mode diagram has been decomposed into the mode(s) in this mode diagram.

Further, the syntax for the mode diagram 162 includes modes M (e.g., source modes SM and destination modes DM), information I connecting the two, and the mode diagram name MD. For example, the additional syntax for the mode diagram 162 is @<mode-diagram>@ <Mode-Diagram-Name> <Source-Mode-Name> Destination-Mode-Name [Information, Requirement Number]. The information may include conditions for each sub-mode change and the resulting actions. The two forms of the syntax for the mode diagram 162 therefore (i) identify the parent mode diagram 162 and the parent mode M in it for which this mode diagram 162 is a detailed expansion of and (ii) detail this mode diagram 162 itself in terms of the modes M it is composed of and the information I connecting them.

Referring to FIGS. 5 and 6, two mode diagrams 162 are illustrated. FIG. 5 is a parent mode diagram 162 of the mode diagram 162 of FIG. 6. Particularly, FIG. 6 is a mode diagram 162 of sub-modes M of one of the modes M of the mode diagram 162 of FIG. 5. Each mode diagram 162 includes a number of modes M that are associated by information I and is identified by a mode diagram name MD, which includes a parent diagram name PD and a parent mode name PM.

Referring to FIG. 5, the mode diagram 162 is identified by mode diagram name MD2, mode diagram name MD1 (not shown) is the parent diagram name PD, and mode M1 is the mode in parent mode diagram MD1 that is expanded in the mode diagram 162 of FIG. 5. Here, information I1 associates mode M2 as a source mode SM1 to mode M3 as a destination mode DM1; and information I2 associates M3 as a source mode SM2 to mode M2 as a destination mode DM2.

Referring to FIG. 6, the mode diagram 162 is identified by mode diagram name MD3, mode diagram name MD2 (FIG. 5) is the parent diagram name PD, and mode M3 is the mode in mode diagram MD2 that is expanded in the mode diagram 162 of FIG. 6. Here, information I3 associates mode M4 as a source SM3 mode to mode M5 as a destination mode DM3; information I4 associates mode M5 as a source mode SM4 to mode M4 as a destination mode DM4; information I5 associates mode M4 to itself as both a source mode SM5 and a destination mode DM5; and information I6 relates mode M5 as a source mode SM6 to mode M6 as a destination mode DM6.

It should be understood that mode diagrams 162 are generally created for each mode M (e.g., M1, M2, M3, M4, M5).

The second artifact application 126 is further configured to, when executed by the processor 120, cause the processor to automatically analyze the mode diagram 162 to determine some specific paths or all possible paths between a given source mode and a destination mode, for example.

Third Artifact Application

Referring to FIGS. 1, 3, and 7, a third artifact application 127 is configured to, when executed by the processor 120, cause the processor to extract the syntax of the annotations 152 from the annotated requirements document 150 and generate the transition system definition 164 as a function of the syntax of the annotations 152. The syntax includes formalized requirements 170, shown schematically in FIG. 7.

In one embodiment, the transition system definition 164 is or includes a spreadsheet, table, or other layout of data, in which the formalized requirements 170 are organized, such as in respective columns, to relate the formalized requirements 170. As shown in FIG. 7, and described in further detail below, the formalized requirements 170 include requirement numbers #, events E, pre-conditions Pre-C, post-conditions Post-C, sources, destinations, actions AN, and the like (the sources and destinations are not identified expressly in FIG. 7, but are considered shown by the illustration and this description).

Transition system definitions 164 are in some embodiments similar to mode diagrams 160 in that each one partitions a focus software feature at a high level. However, in the transition system definitions 164, the information (e.g., conditions and actions) are specified formally by mathematical structures (e.g., see events described below) found in the syntax rather than by natural language descriptions or other informal specification (e.g., see information described above in connection with FIGS. 4-6).

Exemplary syntax for transition system definitions 164 includes syntax for events, types, variables, and transitions. Syntax for an event includes a direction and an event name. Directions include input, output, and local. For example, an example event syntax is or includes @Event@ direction event_name [Comment, Requirement Number].

Syntax for a type includes a type name and a type. For example, a type syntax is @Type@ <type-name>: Type={semicolon separated value list}. The value list indicates possible values that can be taken by a variable declared to be of that type. For Boolean type, it is TRUE or FALSE and for an enumerated type, called, for example, FEATURE_F1_TYPE, it can be a value such as DISABLED, ENABLED, ENGAGED_IN_X or ENGAGED_IN_Y if those are specified in this list of possible values for a variable of FEATURE_F1_TYPE.

Syntax for a variable includes a direction, a variable name, and a type. For example, variable syntax can be as follows: @Variable@ direction variable-name: Type.

Syntax for a transition includes a source mode name, a pre-condition, an in-event, a destination mode name, a post-condition, and an out-event. Pre-conditions and post-conditions are in some embodiments stated in terms of the values of the variables that get (e.g., are or are expected to be) affected by the transition. The values of the variables will be one of those allowed by its type. If it is of Boolean type, then its value could change from being TRUE (in the pre-condition i.e., before the transition is taken) to being FALSE in the post-condition.

In one embodiment, the transition will occur only in response to the in-event occurring. An example in-event is an automobile accident. Another example in-event is a driver or passenger of an automobile pressing a button on a human-machine-interface (HMI), such as a touch-sensitive in-vehicle display screen. In response to the in-event, the transition is taken, and an out-event occurs as an action, such as a door of the automobile being unlocked.

An example transition syntax is @Transition@ <source-mode-name> <Pre-condition> <in-event>→<destination-mode-name> <Post-condition> <out-event> [Comment, Requirement Number].

Formal Model Application

Referring to FIGS. 1, 7, and 8, a formal model application 128 is configured to, when executed by the processor 120, cause the processor to extract the formalized requirements 170 from the transition system definition 164 and generate a formal model 172 as a function of the formalized requirements 170. In particular, the formal model application 128, when executed by the processor 120, causes the processor to translate the formalized requirements 170 to the formal modeling language of a model checking application 129 to get the formal model 172.

Model Checking Application

Referring to FIGS. 1 and 8, the model-checking application 129 analyzes the formal model 172. The model-checking application 129, when executed by the processor 120, causes the processor to generate an error report 174 for reviewing the formalized requirements 170 to identify any inconsistency or incompleteness in the original informal requirements 132. In one embodiment, the model-checking application 129 is or includes SPIN (Simple Promela Interpreter), SAL (Symbolic Analysis Laboratory), and other like model-checking applications that can analyze a formal model such as 172.

Method

Referring to FIG. 8, an exemplary method 200 is now described. According to a requirements document step 202, the engineering group 140 uses the first application 124 (FIG. 1), which operates as described above, to create the requirements document 130 including the informal requirements 132 associated with the product 146 (FIG. 2). The requirements document 130 is prepared for and accessible by the software group 142 to develop the product software 144 (FIGS. 2 and 8) for the product 146 (FIG. 2).

According to an annotation step 204, the software group 142 accesses the requirements document 130 and uses the first application 124 (FIG. 1), which operates as described above, to generate annotations 152 that are associated with corresponding informal requirements 132 and thereby create the annotated requirements document 150. The annotations include syntax that is configured to generate artifacts 160, 162, 164.

According to a first/second artifact step 206, the first artifact application 125 and the second artifact application 126 cause the processor 120 to access the annotated requirements document 150, extract the syntax, and generate the context diagrams 160 and mode diagrams 162 as a function of the syntax of the annotations 152. Like mode diagrams, multiple context diagrams are possible, for example when a feature is viewed as a composition of multiple sub-features. For example, a context diagram is generated for the feature "Advanced Driver Assistance" as well as for its sub-features "Lane Change Assistance" and "Collision Avoidance."

According to a first review step 208, the context diagrams 160 and the mode diagrams 162 are reviewed by one or both of the engineering group 140 and the software group 142. If the group(s) 140, 142 determine (changes step 209) that changes need to be made to the informal requirements 132 and/or the annotations 152, steps 204, 206, 208, 209 are repeated until no changes are required.

Otherwise, according to a third artifact step 210, the third artifact application 127 cause the processor 120 to access the annotated requirements document 150, extract the syntax, and generate the transition system definition 164, which includes formalized requirements 170, as a function of the syntax in the annotations 152. Syntax for the transition system definition 164 can be inserted along with the syntax for context and mode diagrams 160, 162 or after the context and mode diagrams 160, 162 are reviewed (step 208). In some cases, it is more efficient to do the latter (insert the transition system definition 164 syntax after the context and mode diagrams 160, 162 are reviewed), because any needed first-level changes to the informal requirements would be made before inserting the transition system definition 164 syntax.

According to a formal model step 212, the formal modeling application 128 causes the processor 120 to access the transition system definition 164, extract the formal requirements 170, and generate the formal model 172 in the input language of the model checking application 129 as a function of the formalized requirements 170.

According to a second review step 214, the model checking application 129 causes the processor 120 to analyze the formal model 172. The model checking application 129 analyzes the formal model 172 to find any inconsistencies and incompleteness. Particularly, the model checking application 129 generates an error report 174. The error report 174 and the formal model 172 are reviewed by the engineering group 140 and/or the software group 142 to address consistency and completeness. If the groups 140, 142 determine that changes need to be made to the formal requirements 170, the annotations 152, and/or the informal requirements 132, appropriate modifications are made and some or all of the prior steps of the method 200 are repeated until consistency and completeness is achieved. Otherwise, the formal requirements 170 are implemented into the product software 144.

The above-described embodiments are merely exemplary illustrations of implementations that are set forth for a clear understanding of principles. Variations, modifications, and combinations associated with the above-described embodiments may be made without departing from the scope of the claims. All such variations, modifications, and combinations are included herein by the scope of this disclosure and the following claims.

What is claimed is:

1. A method, comprising:
  receiving, by a requirements-analysis system comprising a processor, informal requirements consisting of a plurality of non-computer-executable natural-language statements describing a function of an automobile; and
  generating, by the requirements-analysis system, based on the informal requirements, software design artifacts for use in designing executable code configured for controlling the function of the automobile, wherein the generating comprises:
  converting the informal requirements into annotated requirements, wherein (i) the annotated requirements comprise a plurality of annotations, (ii) each annotation corresponds to a natural-language statement of the plurality of non-computer-executable natural-language statements, and (iii) each annotation comprises syntax;
  extracting the syntax from the annotations; and
  generating, based on the syntax extracted, the software design artifacts;

wherein the software design artifacts generated are selected from the group consisting of a mode diagram, a context diagram, and a transition definition system.

2. The method of claim 1, wherein the annotations include agents and information associating the agents.

3. The method of claim 1, wherein the context diagram includes agents and information associating the agents.

4. The method of claim 1, wherein the annotations include modes and information associating the modes.

5. The method of claim 1, wherein the mode diagram includes modes and information associating the modes.

6. The method of claim 1, wherein the annotations include formal software requirements.

7. The method of claim 1, wherein the transition definition system includes non-computer-executable formal software requirements.

8. The method of claim 7, further comprising extracting the formal software requirements from the transition definition system.

9. The method of claim 8, wherein extracting the formal software requirements is performed according to an iterative process.

10. A system, comprising:
   a processor; and
   a computer-readable storage device comprising instructions that, when executed by the processor, cause the processor to perform operations comprising:
   receiving informal requirements consisting of a plurality of non-computer-executable natural-language statements describing a function of an automobile; and
   generating, based on the informal requirements, software design artifacts for use in designing executable code configured for controlling the function of the automobile, wherein the generating comprises:
   converting the informal requirements into annotated requirements, wherein (i) the annotated requirements comprise a plurality of annotations, (ii) each annotation corresponds to a natural-language statement of the plurality of non-computer-executable natural-language statements, and (iii) each annotation comprises syntax;
   extracting the syntax from the annotations; and generating, based on the extracted syntax, the software design artifacts;
   wherein the software design artifacts generated are selected from the group consisting of a mode diagram, a context diagram, and a transition definition system.

11. The system of claim 10, wherein the annotations include agents and information associating the agents.

12. The system of claim 10, wherein the context diagram includes agents and information associating the agents.

13. The system of claim 10, wherein the annotations include modes and information associating the modes.

14. The system of claim 10, wherein the mode diagram includes modes and information associating the modes.

15. The system of claim 10, wherein the annotations include formal software requirements.

16. The system of claim 10, wherein the transition definition system includes non-computer-executable formal software requirements.

17. The system of claim 16, wherein the operations further comprise extracting the formal software requirements from the transition definition system.

18. The system of claim 17 wherein extracting the formal software requirements is performed according to an iterative process.

19. A system, comprising:
   a processor; and
   a computer-readable storage device comprising instructions that, when executed by the processor, cause the processor to perform operations comprising:
   generating, based on informal requirements comprising non-computer-executable natural language statements describing a function of an automobile, software design artifacts for use in designing executable code configured for controlling the function of the automobile;
   wherein the generating comprises converting the informal requirements into annotated requirements, wherein (i) the annotated requirements comprise a plurality of annotations, (ii) each annotation corresponds to a non-computer-executable natural-language statement, and (iii) each annotation includes syntax; extracting the syntax from the annotations; and
   generating, based on the extracted syntax, the software design artifacts; and
   wherein the software design artifacts generated are selected from the group consisting of a mode diagram, a context diagram, and a transition definition system.

20. The system of claim 9, wherein the operations further comprise extracting the formal software requirements from the transition definition system.

* * * * *